J. F. ADAMS.
MACHINE FOR MAKING BOXES.
APPLICATION FILED DEC. 20, 1909. RENEWED APR. 21, 1915.

1,160,558.

Patented Nov. 16, 1915.
6 SHEETS—SHEET 3.

Witnesses:
E. H. Clegg
G. W. Demarus Jr.

Inventor:
Joseph F. Adams
By Bulkley Durand & Ding
Attorneys

J. F. ADAMS.
MACHINE FOR MAKING BOXES.
APPLICATION FILED DEC. 20, 1909. RENEWED APR. 21, 1915.

1,160,558.

Patented Nov. 16, 1915.
6 SHEETS—SHEET 5.

J. F. ADAMS.
MACHINE FOR MAKING BOXES.
APPLICATION FILED DEC. 20, 1909. RENEWED APR. 21, 1915.

1,160,558.

Patented Nov. 16, 1915.
6 SHEETS—SHEET 6.

Witnesses:
E. H. Clegg
G. V. Domarus Jr.

Inventor:
Joseph F. Adams
By Buckley, Durand & Drury
Attorneys

UNITED STATES PATENT OFFICE.

JOSEPH F. ADAMS, OF ST. CLAIR, MICHIGAN.

MACHINE FOR MAKING BOXES.

1,160,558.  Specification of Letters Patent.  Patented Nov. 16, 1915.

Application filed December 20, 1909, Serial No. 534,037. Renewed April 21, 1915. Serial No. 22,946.

*To all whom it may concern:*

Be it known that I, JOSEPH F. ADAMS, a citizen of the United States of America, and resident of St. Clair, St. Clair county, Michigan, have invented a certain new and useful Improvements in Machines for Making Boxes, of which the following is a specification.

My invention relates to machines for making berry boxes of that kind in which the corners of the bottom extend through the sides or band of the box, which consists of a strip of veneer scored to provide four sides that are connected by flat corner portions, and which corner portions are slotted to receive the corners of the bottom, whereby no fastening devices are necessary for securing the bottom in place, the fastening together of the ends of the band or sides, by staples or otherwise, being sufficient for this purpose.

Generally stated, the object of my invention is to provide a novel and efficient machine for making berry boxes of the foregoing general character, in which the bands and bottoms are properly assembled to cause the four corners of each bottom to push their way outwardly through the flat corner sections of the band, and in which this forming operation is accomplished through the medium of a stationary form which coöperates with the folding mechanism arranged immediately below, as will hereinafter more fully appear.

It is also an object to provide certain details and features of construction and combinations tending to increase the general efficiency and desirability of a box making machine of this particular character, with a view to reducing the production of these boxes to an economical and strictly commercial basis, or more nearly so than heretofore, as will also hereinafter fully appear.

To these and other useful ends my invention consists in matters hereinafter set forth and claimed, but I do not limit myself to the exact construction shown and described.

A special object of my present invention is to provide mechanism by which the bands may be fed endwise to the folding mechanism.

In the accompanying drawings.

Figure 1:
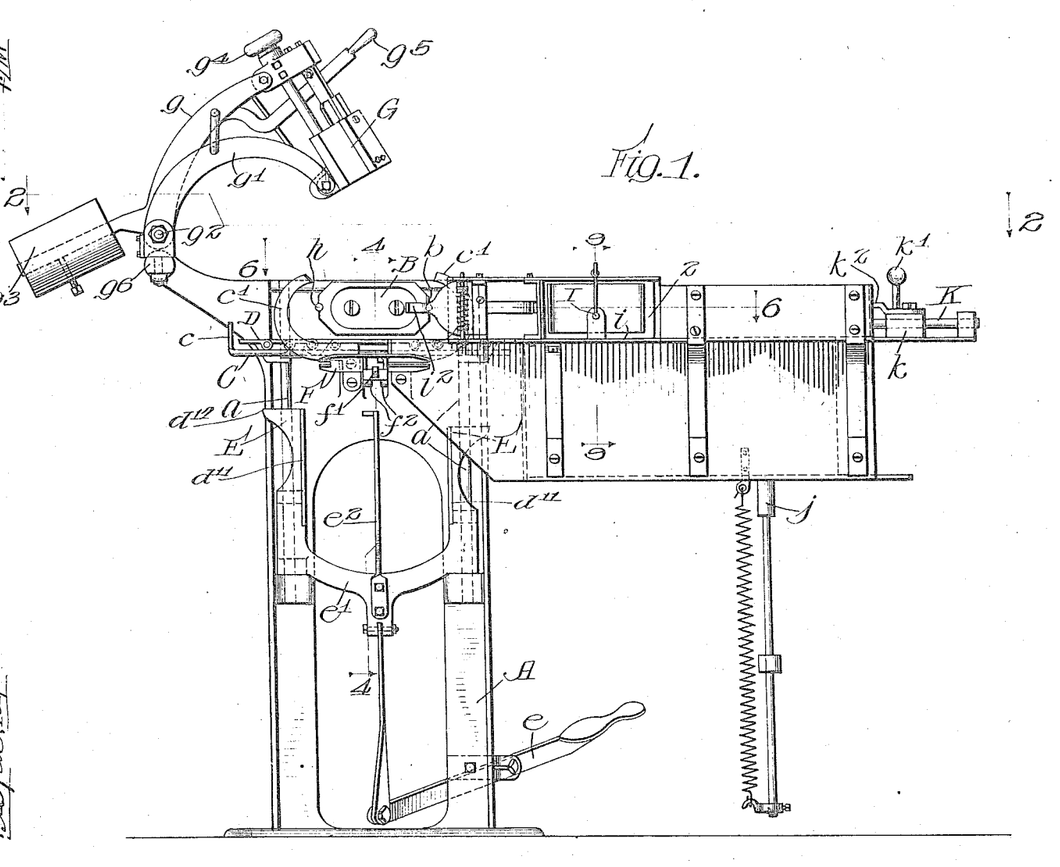
Figure 1 is a front elevation of a box machine embodying the principles of my invention.
Figure 2:
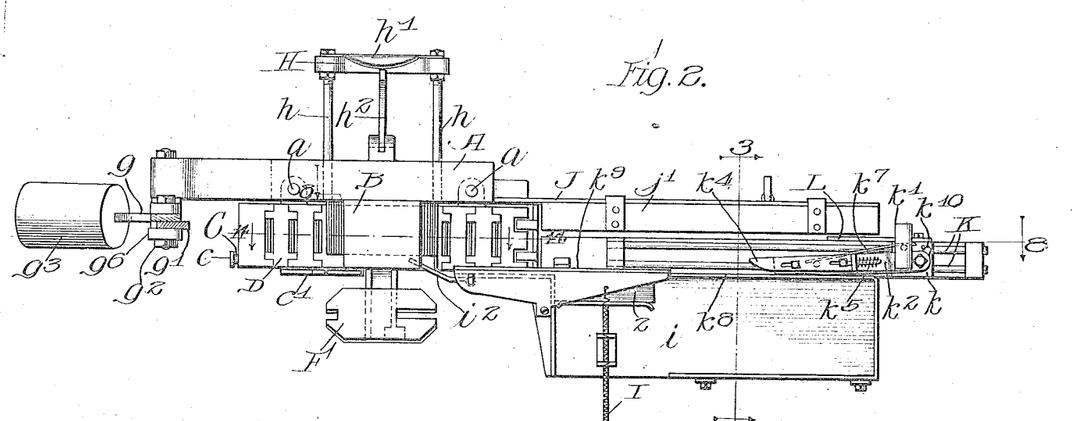
Fig. 2 is a plan of the machine shown in Fig. 1, being a section on line 2—2.
Figure 8:
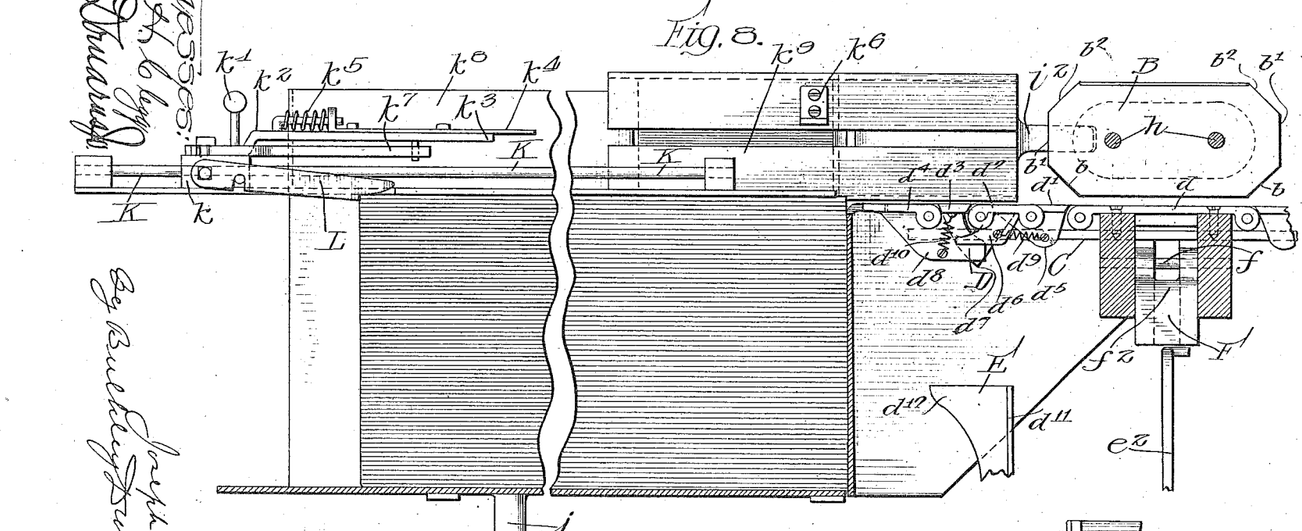
Fig. 8 is an enlarged section on line 8—8 in Fig. 2.
Figure 9:
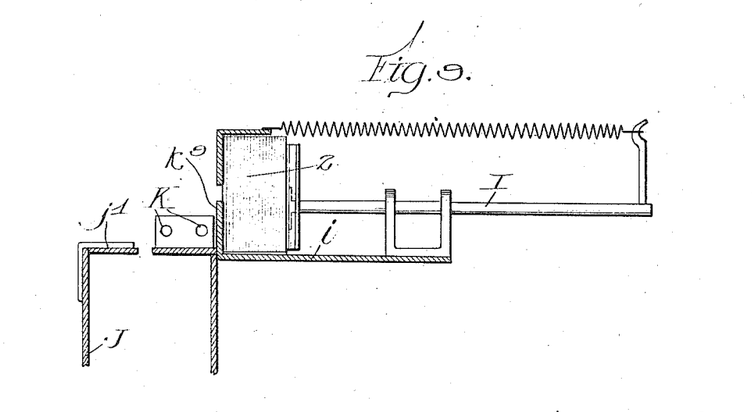
Fig. 9 is an enlarged section on line 9—9 in Fig. 1.
Figure 14:
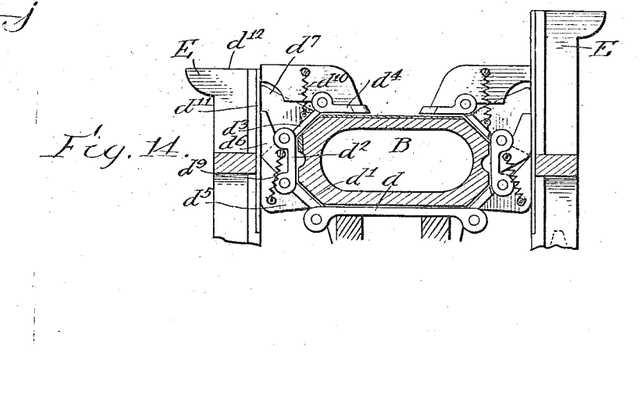
Fig. 14 is an enlarged detail section on line 14—14 in Fig. 2, looking in the direction indicated by the arrows, showing the folding mechanism wrapped or folded around the stationary form, and illustrating the positions of the different cams and links of said mechanism at the time that the folding of the band is completed.

As thus illustrated, my invention comprises an upright frame or body A having a pair of upright guides *a*. At the top of this frame there is a form B, and a support C below the said form. The series of links D, rest normally in horizontal position on the support C. These links constitute the folder for pressing the band or sides of the box upon the frame B. Said folder is below the said form and adapted to be pushed upward and flexed or bent around the form by the vertically movable cam members E. The form has flat corners to form the flat corners of the box, and the folder has links that conform to said flat corners. These members E slide up and down on the guides *a*, and are operated by a foot treadle *e*. The band or sides 1 of the box is fed upon the flat upper surface of the folder D, with the bottom 2 resting edgewise thereon. When the folder is operated by the members E, the said band or sides 1 is caused to fold about the bottom 2, so that the corners 3 of said bottom project through the flat corners of the box. For this purpose the said band can be slotted to receive the corners, or the said corners can be forcibly pushed through the wood veneer of which the band 1 is made. A stop $c$ on the end of the support C limits the forward motion of the band, and curved arms $c'$ keep the ends of the band in proper alinement while they are being bent upward. These curved arms $c'$ serve to keep the folder D in place, when the latter is actuated upward by the members E, which latter operate in the following manner. As shown in Fig. 8, the flexible link folding mechanism D comprises a middle or center link $d$ which is disposed immediately below the form B, and upon which the band of the box is deposited. As the series of links at opposite ends of this plate $d$ are the same at both sides, the description of the links shown at the left of this plate in Fig. 8 will be sufficient. The link $d^1$ is pivoted to the end of the plate or link $d$, another link $d^2$ is pivoted to the link $d^1$, a link $d^3$ is pivoted to the end of the link $d^2$, and the end link $d^4$ is pivoted to the end of the link $d^3$, it being understood that these links are flat faced on their upper surfaces, whereby these surfaces are all in the same horizontal plane when the mechanism is in normal position as shown in Fig. 8. The link $d^1$ is adapted to bear against the flat corner surface $b$ of the form, the link $d^2$ is adapted to bear against the flat end surface $b^1$ of the form, the link $d^3$ is adapted to bear against the flat corner surface $b^2$ at the top of the form, and the link $d^4$ is adapted to bear down upon the top of the form. For this purpose the link $d^1$ is provided on its lower surface with a cam $d^5$, the link $d^2$ is provided with a cam $d^6$, the link $d^3$ is provided with a cam $d^7$, the link $d^4$ is provided with a cam $d^8$, said cams being of any suitable or desired shape, but preferably having the different shapes shown in Fig. 8. The members E have straight inner vertical surfaces $d^{11}$, and flat top surfaces $d^{12}$, which surfaces operate the said cams on the under sides of the links. It will be seen that these cams are arranged in such position that when the members E move upward the upper ends thereof first engage the cams $d^8$ at opposite ends of the link folding mechanism, and as the movement progresses these cams are finally brought into vertical alinement against the inner surfaces $d^{11}$, in the manner shown in Fig. 14, and in this way the folding action progresses from the outer links toward the center link $d$, with the final result that the band of the box is caused to conform with the stationary form B in the manner previously described. A spring $d^9$ connects together the cams $d^5$ and $d^6$ and a spring $d^{10}$ connects the cam $d^8$ with the link $d^3$, whereby the link folding mechanism automatically straightens out or assumes a horizontal position when the members E move downward and return to normal position. Referring to Figs. 1 and 14, it will be seen that one of the members E is higher than the other, whereby one end portion of the link folding mechanism D is brought forward and over ahead of the other end portion, whereby one end of the band i folded down first, and the other end portion then folded thereon. In other words, this causes the opposite end portions of the band to properly lap when they come together. During this folding operation the sharp corners 3 of the bottom of the box punch holes through the flat corner sections of the band, or if preferred these slots in the band can be formed first and before the bands are inserted in the machine. The frame $e'$, that carried the members E, is also provided with an arm $e^2$ adapted to actuate the pivoted clamping plate F. It will be seen that this plate F is pivoted at $f$ to the frame A, and is provided with a roll $f'$ adapted to be engaged by the upper end of the arm $e^2$. A stop $e^3$ on the frame of the machine engages the rear end $f^2$ of the said clamping plate, whereby the latter is held in its normal position. When the frame $e'$ moves upward, the band of the box is folded around the form B, and around the rectangular bottom of the box, and while this is being done the bottom of the box is held flatwise upon the front or face of the form B by the clamp F. For this purpose the roll $f'$ is adapted to engage the inner vertical edge of the arm $e^2$, so that the clamp holds the bottom of the box during the stapling operation.

Figures 10, 11, 12:
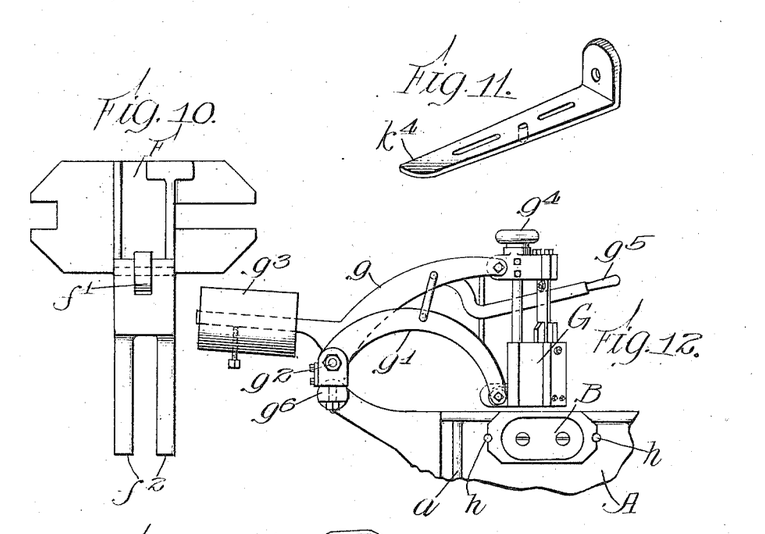
Fig. 10 is a detail view of the clamp for holding the bottom of the box upon the form while the box is being stapled or fastened together.
Fig. 11 is a perspective of the cam finger that forms a part of the feed mechanism.
Fig. 12 is a detail fragmentary view of the stapling mechanism shown in Fig. 1, showing said mechanism in position for operation.
Figure 13:
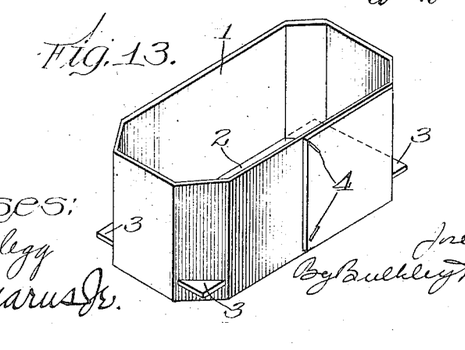
Fig. 13 is a perspective of the box made by the said machine.

The stapler G is mounted upon a couple of swinging arms $g$ and $g'$ which are pivoted to the body frame at $g^2$. The stapling mechanism is counterbalanced by an adjustable weight $g^3$. This stapling mechanism can be of any suitable character, and is provided with handles $g^4$ and $g^5$ for raising and lowering and operating the same. The arms carrying the stapling mechanism can be controlled by a friction device $g^6$, whereby the said mechanism will remain in elevated position, as shown in Fig. 1, or in lowered position as shown in Fig. 12.

When the box is finished, it is removed from the form by the stripper H, which latter consists of a couple of parallel and horizontally disposed rods $h$ that slide through the frame A and engage the ends of the box. For this purpose the ends of the form B are provided with grooves, as shown more clearly in Fig. 1. The said stripper has a handle $h'$ by which it can be operated, and it is then restored to normal position by a spring-pressed arm $h^2$.

Figure 3:
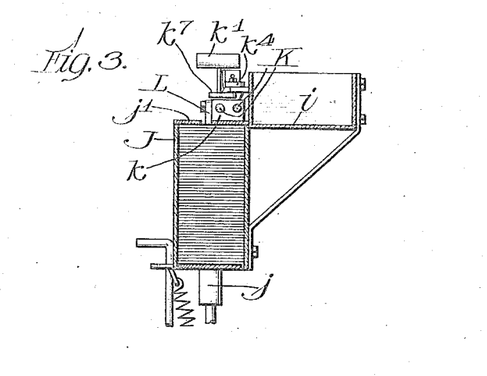
Fig. 3 is a detail vertical section on line 3—3 in Fig. 2.
Figures 4, 5:
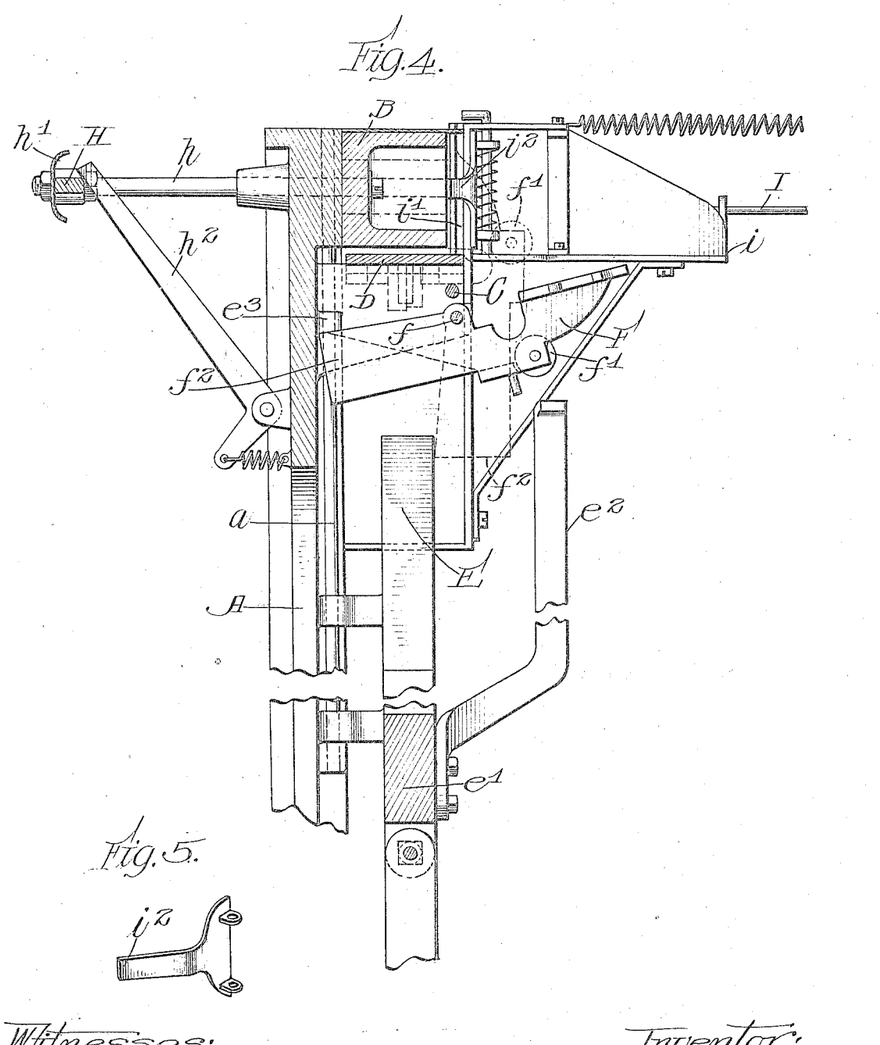
Fig. 4 is an enlarged detail section on line 4—4 in Fig. 1.
Fig. 5 is a perspective of the spring pressed plunger for holding the bottom of the box against the form while the said bottom is being fed into position.
Figures 6, 7:
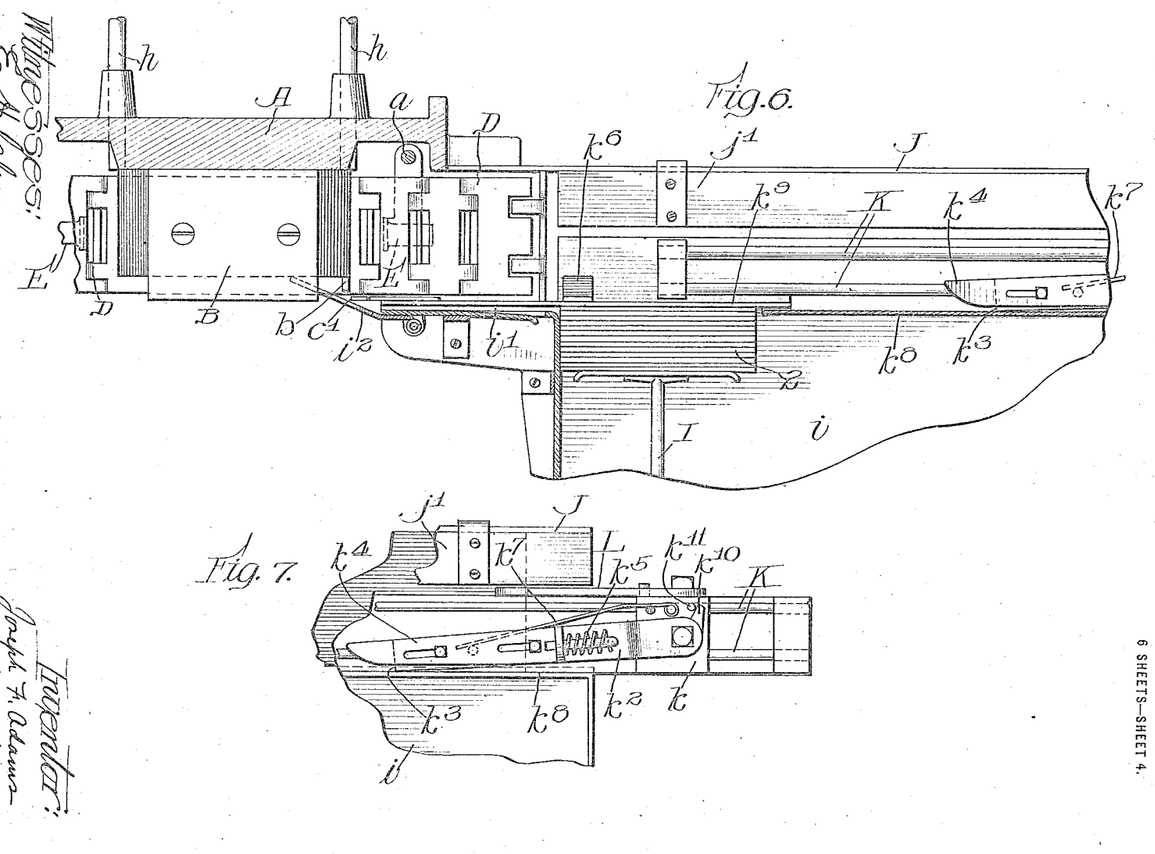
Fig. 6 is a horizontal section on an enlarged scale, on line 6—6 in Fig. 1.
Fig. 7 shows that portion of the machine that is shown broken away at the right of Fig. 6.

The bands or sides of the boxes, and the bottoms thereof, are fed into place by hand-operated mechanism, as follows: The bottoms 2 (see Fig. 6) are held in place in pack form by a spring-pressed plunger I, so that they rest edgewise upon the table $i$. A vertical slot or channel $i'$, serves as a passage whereby the bottoms are fed to the desired position in front of the form. When a bottom is pushed forward, it is held in place by the spring-pressed finger $i^2$. The bands or sides $l$ are held in pack form in a hopper J, the bands and sides being superimposed one upon the other, whereby the uppermost band or strip of veneer can be fed forward upon the flat upper surface of the folder D, when the latter is flattened out or in normal position, as shown in Fig. 1. To the right of the form and folding mechanism, there is a pair of parallel rods K, and upon these rods a sliding cross head $k$. This cross head is operated by a handle $k'$. A feed pawl or dog $k^2$ is pivoted upon the said cross head $k$, and provided with a corner or end portion $k^3$ adapted to engage the edge of the bottom to feed the latter forward. A cam finger $k^4$ is adjustably secured upon the feed pawl $k^2$ and controlled by springs $k^5$, which cam finger is adapted to engage the lug $k^6$. When this engagement takes place, the finger $k^4$ remains stationary, while the feed pawl $k^2$ move forward a short distance to complete the forward feeding movement of the bottom of the box. This is necessary in order to feed the said bottom into position to enable its rear end edge to snap into position behind the lug $b$ at the end of the form. When the feed pawl $k^2$ is retracted, and when it is again moved forward, its rounded end portion rests upon the flat face or surface of the bottom, whereas the corner $k^3$ engages the edge of the said bottom. The sliding connection between the pawl $k^2$ and the finger $k^4$ is such that the corner portion $k^3$ can move substantially to the end of the finger $k^4$. Thus the portion $k^3$ can, as stated, advance forward to a point where it will bring the edge of the bottom which it is engaging into position to be snapped behind the lug $b$, by the pressure of the spring-controlled finger $i^2$. The spring $k^1$ is so applied that it keeps the feed pawl $k^2$ and the finger $k^4$ normally in the position shown in Fig. 7. When the upturned portion of the finger $k^4$, which portion is engaged by the spring $k^5$, is engaged by the stationary lug $k^6$, then the further forward movement of the feed pawl $k^2$ is in opposition to the tension of the spring $k^5$. Thus the finger $k^2$ engages the outermost bottom of the pack, and feeds the same forward to the required position, and when the bottom is in position, the feed pawl $k^2$ is thrown out of engagement therewith. A spring $k^7$ holds the feed pawl $k^2$ against the plate $k^8$. The pack of bottoms is held pressed against the plates $k^9$, which are slightly separated to receive the feed pawl $k^2$. The bands or sides are fed forward by a feed finger or pawl L which is pivoted upon the cross head $k$. This feed pawl L engages the end edge of the uppermost band and feeds the same forward upon the folder D. It will be seen that the spring-pressed finger $i^2$ carries the bottom of the box over upon the band, so that the latter is wrapped about the said bottom. The bands and bottoms are fed by the same mechanism, that is by the same movement of the cross head $k$, and the bottom is then shifted over so that it rests edgewise upon the inner and upper surface of the band. Preferably, the rear end of the feed pawl $k^2$ has a lug $k^{10}$ adapted to rest against the stationary pin $k^{11}$ on the sliding block or cross head $k$. This provision serves to limit the swinging motion of the feed pawl $k^2$ under the influence of the spring $k^7$, which is desirable, inasmuch as the said feed pawl is drawn or moved entirely out of engagement with the pack of bottoms 2. The bands are held in the hopper J and supported by a spring-pressed plunger or vertically movable support $j$. This support $j$ presses the pack of bands upward against the plate $j'$, which latter is slotted to receive the feed pawl L. See Figs. 3 and 8.

The mode of operation may be as follows: The operator grasps the handle $k'$ and thereby pulls the feed pawls toward the form B. In this way a band and a bottom are fed into place, with the bottom standing up edgewise upon the surface of the band, in the manner explained. Then the operator actuates the foot lever $e$ to cause the folder D to bend the band, which is scored transversely at the points where it is to bend around the form, and to thereby cause the corners 3 of the bottom to project through the flat corner portions of the band. The bottom, at such time, is held in place by the clamping plate F, in the manner explained. Then the operator swings the stapling mechanism G down into place, and operates the same to drive the staples 4. These staples secure the lapping end portions of the band together, and are sufficient to hold the entire box together. Then the operator, after raising the stapling mechanism and restoring the feed mechanism to normal position, operates the stripper H, and the box is disengaged from the form and discharged from the machine. Before the box can be thus stripped from the form, the operator must release the foot lever $e$, so as to allow the folder D to drop down into normal position. The spring-pressed finger $i^2$ yields and swings around sufficiently to allow the box to be removed from the form.

I do not limit myself to the exact construction shown and described, as other methods of feeding the stock by hand, and other devices for feeding the bands endwise, in a machine for making boxes of this or similar character, may be employed without departing from the spirit of my invention.

What I claim as my invention is:

1. In a machine for making boxes, the combination of a stationary form, a flexible folder below the said form, a hopper at one end of said folder, said hopper adapted to contain the bands or strips of veneer, a feed pawl, and means for operating the same, which feed pawl is adapted to engage the outer end of the uppermost band or strip of veneer, to feed the same forward upon the folder and below the form, by motion of the said band or strip of veneer in a direction lengthwise of the said folder and form, which motion is also in a direction lengthwise of the band or strip of veneer itself, means for operating said folder to bend the band or strip of veneer around the form, to cause the corners of the bottom to project through the band, means for operating on the band to fasten the box together, said folding mechanism comprising a stationary form, means operating against the form to secure the ends of the band together, the said folding means comprising a plurality of connected links, and means for actuating the links.

2. In a machine for making boxes, a form, means for holding the bands or sides one on top of the other, means for holding the bottoms vertical one against the other, means for simultaneously feeding a bottom and a band into place upon the form, with the bottom resting edgewise upon the upper surface of the band, the bands being fed from the top of the stack, and mechanism for then folding the band about the form, to cause the corners of the bottom to project through the band or strip of veneer.

3. In a machine for making boxes, the combination of a form, hand-operated mechanism for feeding the bottoms and bands or strips of veneer to the form, the feeding motion of the bands or strips of veneer being parallel with the feeding motion of the bottoms, the bands being fed from the top of the stack, mechanism for folding the bands around the bottoms, to cause the corners of the latter to project through the corner portions of the bands, a manually controlled mechanism for stapling together the lapping end portions of the bands, and manually controlled means for stripping the boxes from the form.

4. In a machine for making boxes, the combination of a stationary form, said form having flat corners for forming the flat corners of the box, hand-operated mechanism for feeding the bottoms and bands or strips of veneer to the form, with each bottom against the form, the feeding motion of the bands or strips of veneer being parallel with the feeding motion of the bottoms, both the bands and the bottoms being fed edgewise, mechanism for folding the bands around the bottoms, to cause the corners of the latter to project through the corner portions of the bands, a manually controlled mechanism for stapling together the lapping end portions of the bands, and manually-controlled means for stripping the boxes from the form.

5. In a machine for making boxes, the combination of a stationary form, said form having flat corners for forming the flat corners of the box, means for holding a stack of bands or strips of veneer, disposed in longitudinal alinement with said form, suitably operated means for feeding the said bands or strips of veneer endwise to a position below the form, by motion in a direction longitudinal of the form, means for holding a bottom in place on the form, mechanism for folding each band or strip of veneer about the form, to cause the corners of the bottom to project through the band or strip of veneer, means operating against the form to secure the ends of the band together, the said folding means comprising a plurality of connected links, some of which links conform to said flat corners, and means for actuating the links.

6. In a machine for making boxes, the combination of a stationary form, said form having flat corners for forming the flat corners of the box, hand-operated mechanism for feeding the bottoms and bands or strips of veneer to the form, with each bottom against the face of the form, by edgewise motion of the bands and bottoms, the feeding motion of the bands or strips of veneer being parallel with the feeding motion of the bottoms, mechanism for folding the bands around the bottoms, to cause the corners of the latter to project through the corner portions of the bands, a manually-controlled mechanism for stapling together the lapping end portions of the bands, manually-controlled means for stripping the boxes from the form, the said folding means comprising a plurality of connected links, some of which links conform to said flat corners, and means for actuating the links.

7. In a machine for making boxes, the combination of a stationary form, means for holding a pack of bands or sides, disposed at one side of said form, a movable folder below the form, means for feeding the bands endwise upon the upper surface of the folder, from the top of the pack, the said bands being held one upon the other at one end of the folder, means for operating the said folder upwardly, to fold the bands or sides, means for stapling the ends of the folded band together, and a stop for the end of the band.

8. In a machine for making boxes, the combination of hand-operated folding mechanism, a stationary form coöperating therewith, hand-operated mechanism for feeding the bands and bottoms to the said folding mechanism, by edgewise motion of the bands and bottoms in parallel directions, means for manually operating the folding mechanism, to cause the corners of the bottoms to project through the band, to form a box with flat corners, means for operating upon the folded band to secure the box together, the said folding means comprising a plurality of connected links, some of which links conform to said flat corners, and means for actuating the links.

9. In a machine for making boxes, the combination of a stationary form, said form having flat corners for forming the flat corners of the box, hand-operated mechanism for feeding the bands and bottoms to the form, by edgewise motion of the bands and bottoms in parallel directions, manually-operated mechanism for folding the bands about the form, to cause the corners of each bottom to project through the bands, means for operating upon the folded band to secure the box together, the said folding means comprising a plurality of connected links, some of which links conform to said flat corners, and means for actuating the links.

10. In a machine for making boxes, a stationary form, said form having flat corners for forming the flat corners of the box, means for holding the bands or sides one on top of the other, means for holding the bottoms vertical, one against the other, means for simultaneously feeding a bottom and a band into place upon the form, by edgewise motion of the band parallel with the edgewise motion of the bottom, with the bottom resting edgewise upon the upper surface of the band, against the end of the form, mechanism for then folding the band about the form, to cause the corners of the bottom to project through the band or strip of veneer, the said folding means comprising a plurality of connected links, some of which links conform to said flat corners, and means for actuating the links.

11. In a machine for making boxes, the combination of a stationary form, said form having flat corners for forming the flat corners of the box, hand-operated mechanism for feeding the bands and bottoms to the form, by parallel edgewise motion of the bands and bottoms, manually-operated mechanism for folding the bands about the form, to cause the corners of each bottom to project through the bands, means for operating upon the folded band to secure the box together, the said folding means comprising a plurality of connected links, some of which links conform to said flat corners, and means for actuating the links.

12. In a machine for making boxes, the combination of a stationary form, said form having flat corners for forming the flat corners of the box, a flexible folder below the said form, a hopper at one end of said folder, said hopper adapted to contain the bands or strips of veneer, a feed pawl, and means for operating the same, which feed pawl is adapted to engage the outer end of the uppermost band or strip of veneer, to feed the same forward upon the folder and below the form, by edgewise motion of the said band or strip of veneer in a direction lengthwise of the said folder and form, which motion is also in a direction lengthwise of the band or strip of veneer itself, means for operating said folder upwardly to bend the band or strip of veneer around the form, to cause the corners of the bottom to project through the band, and means operating against the form to secure the ends of the bands together.

13. In a machine for making boxes, the combination of a stationary form, said form having flat corners for forming the flat corners of the box, means for holding a stack of bands or strips of veneer, disposed in longitudinal alinement with said form, suitably operated means for feeding the said bands or strips of veneer endwise to a position below the form, by motion in a direction longitudinal of the form, means for holding a bottom in place on the form, mechanism for folding each band or strip of veneer about the form, to cause the corners of the bottom to project through the band or strip of veneer, means operating against the form to secure the ends of the bands together, the said folding means comprising a plurality of connected links, some of which conform to said flat corners, and means for actuating the links.

14. In a machine for making boxes, a stationary form, means for feeding the bands endwise below the form, disposed at one side of the form, means for bending the band upward and around the form, means for stapling together the ends of the band on top of the form, and a stop for the end of the band.

15. A machine for making boxes, comprising mechanism for clamping the bottoms in fixed position, mechanism for folding the bands about the bottoms, and means for feeding the bands endwise to said folding mechanism, while the clamping mechanism is open, together with a stop for engaging and thereby limiting the endwise feed of each band into position for folding.

16. In a box machine, a stationary form, means for clamping a bottom against the form, having motion relative thereto, toward and away from the same, means for feeding a band below the form, movable means for folding the band upward and around the form, with the corners of the bottom projecting through the flat corner portions of the band, stationary means for supporting said clamping means, and means for stapling together the ends of the band on top of the form, said form having a fixed position throughout the entire folding operation.

17. In a machine for making boxes, the combination of means for holding the bottoms in vertical planes one against the other, mechanism for feeding the bottoms, by horizontal edgewise movement of each bottom, mechanism for feeding the sides, mechanism for folding the sides about the bottom, and means upon which the lower edge of each bottom slides as it moves into position.

18. In a box machine, a stationary form having end grooves to receive the endwise movable rods that strip the box from the form, a rigid connection for said rods outside of the form, and a folding mechanism alternating in its operation with the forward movement of the said rods.

19. In a machine for making boxes, the combination of mechanism for feeding veneer or other stock for the bottoms, by horizontal edgewise movement of each bottom, means upon which the lower edge of each bottom slides as it moves into position, and folding mechanism for causing the corners of the bottoms to project through the sides of the box, operative in conjunction with said feed mechanism.

20. In a box machine, a flexible folding mechanism, and means for progressively actuating said mechanism from its ends toward the center, comprising two vertically movable members having vertical surfaces, and cams on said mechanism, which cams engage said surfaces.

Signed by me at St. Clair, Michigan, this 1st day of December, 1909.

JOSEPH F. ADAMS.

Witnesses:
 FRANK CURRIER,
 JOHN M. SULLIVAN.